United States Patent
Do

(10) Patent No.: US 8,353,316 B2
(45) Date of Patent: Jan. 15, 2013

(54) FLEXIBLE PIPE FOR CONVEYING HYDROCARBONS IN DEEP WATER

(75) Inventor: Anh Tuan Do, Cormeilles en Parisis (FR)

(73) Assignee: Technip France (FR)

( * ) Notice: Subject to any disclaimer, the term of this patent is extended or adjusted under 35 U.S.C. 154(b) by 232 days.

(21) Appl. No.: 12/812,055

(22) PCT Filed: Jan. 7, 2009

(86) PCT No.: PCT/FR2009/000010
§ 371 (c)(1),
(2), (4) Date: Sep. 1, 2010

(87) PCT Pub. No.: WO2009/112664
PCT Pub. Date: Sep. 17, 2009

(65) Prior Publication Data
US 2010/0326558 A1   Dec. 30, 2010

(30) Foreign Application Priority Data
Jan. 11, 2008 (FR) ...................................... 08 00164

(51) Int. Cl.
*F16L 11/12* (2006.01)

(52) U.S. Cl. ........ 138/134; 138/135; 138/129; 138/138; 138/144

(58) Field of Classification Search .................. 138/129, 138/135, 130, 137, 138, 144, 148, 134
See application file for complete search history.

(56) References Cited

U.S. PATENT DOCUMENTS

| | | | |
|---|---|---|---|
| 4,273,160 A | 6/1981 | Lowles | |
| 5,176,179 A | 1/1993 | Bournazel et al. | |
| 5,275,209 A * | 1/1994 | Sugier et al. | 138/135 |
| 5,327,714 A * | 7/1994 | Stevens et al. | 57/230 |
| 6,123,114 A * | 9/2000 | Seguin et al. | 138/124 |
| 6,843,278 B2 * | 1/2005 | Espinasse | 138/134 |
| 6,966,344 B2 * | 11/2005 | Coutarel et al. | 138/129 |
| 7,124,780 B2 * | 10/2006 | Dupoiron | 138/134 |
| 7,572,745 B2 * | 8/2009 | Branch et al. | 442/310 |
| 2005/0115623 A1 * | 6/2005 | Coutarel et al. | 138/135 |
| 2006/0016499 A1 * | 1/2006 | Blanchard et al. | 138/110 |
| 2006/0151042 A1 * | 7/2006 | Stringfellow et al. | 138/125 |
| 2008/0072984 A1 * | 3/2008 | Branch et al. | 138/124 |
| 2010/0018717 A1 * | 1/2010 | Espinasse et al. | 166/346 |
| 2010/0101675 A1 * | 4/2010 | Do et al. | 138/130 |

FOREIGN PATENT DOCUMENTS

| | | |
|---|---|---|
| FR | 2 837 899 A1 | 3/2003 |
| WO | WO 97/12753 A | 4/1997 |
| WO | WO 97/13091 | 4/1997 |
| WO | WO 2006/005689 A | 1/2006 |

* cited by examiner

*Primary Examiner* — Patrick F Brinson
(74) *Attorney, Agent, or Firm* — Ostrolenk Faber LLP

(57) ABSTRACT

A subsea flexible pipe, including an internal sealing sheath (18), at least one tensile pressure armor layer (14, 16) wound around the internal sealing sheath, a retaining layer (12) having at least one reinforcing strip (34), the reinforcing strip having filamentary strands (36) directed substantially longitudinally. The filamentary strands (36) having polymer fibers (38). The polymer fibers have, at room temperature, an elastic modulus in excess of 55 GPa so that the reinforcing strip is able to prevent radial expansion of the armor layer, when the armor layer experiences radial force; and the polymer fibers furthermore have an elongation at break in excess of 4% such that the reinforcing strip is able to undergo deformation without breaking.

17 Claims, 2 Drawing Sheets

FLEXIBLE PIPE FOR CONVEYING HYDROCARBONS IN DEEP WATER

CROSS REFERENCE TO RELATED APPLICATION

The present application is a 35 U.S.C. §§371 national phase conversion of PCT/FR2009/000010, filed Jan. 7, 2009, which claims priority of French Application No. 0800164, filed Jan. 11, 2008, the disclosure of which is incorporated by reference herein. The International Application was published in the French Language

BACKGROUND OF THE INVENTION

The present invention relates to a subsea flexible pipe for conveying hydrocarbons in deep water.

Flexible pipes for conveying hydrocarbons are already well known, and they generally comprise, from the interior to the exterior of the pipe, a metal carcass, a polymer internal sealing sheath, a pressure armor layer, tensile pressure armor layers, and a polymer external sheath to protect the overall pipe and in particular to prevent seawater from penetrating its thickness. The metal carcass and the pressure armor layer comprise longitudinal elements wound in a short pitch, which enable the pipe to withstand radial forces, while the tensile pressure armor layers comprise metal yarns wound in a long pitch to absorb the axial forces. The type, number, dimensions and organization of the layers constituting the flexible pipes are essentially related to their conditions of use and installation. In the present application, the short pitch winding concept designates any helical winding at a helix angle close to 90°, typically between 75° and 90°. The long pitch winding concept concerns helix angles lower than 55°, typically between 25° and 55° for the armor layers.

These flexible pipes are suitable for conveying hydrocarbons, in particular on the seabed and at great depths. More precisely, they are referred to as unbonded, and are thus described in the standards published by the American Petroleum Institute (API), API 17J and API RP 17B.

When the flexible pipe, regardless of its type, is subjected to an external pressure that is higher than the internal pressure, an axial compression may occur, known to a person skilled in the art as the reverse end cap effect. The reverse end cap effect tends to compress the flexible pipe axially, to shorten it, and to increase its diameter, thereby tending to cause a swelling of the tensile pressure armor layers. In the case in which the external sheath of the pipe is sealed, the hydrostatic pressure prevailing outside the pipe effectively opposes the swelling of the tensile pressure armor layers. On the contrary, if the external sheath is no longer sealed, for example due to an accidental tear, the hydrostatic pressure no longer opposes the swelling of the tensile pressure armor layers. In the absence of an additional means for limiting this swelling, the yarns constituting the tensile pressure armor layers are then liable to buckle radially, which may cause an irreversible local deformation of said armor layers into a "birdcage" shape, and thus lead to the failure of the pipe.

One known solution for reducing this risk of radial buckling into a "birdcage" is the short pitch winding of reinforced strips of aramid fibers, and more precisely of poly(paraphenylene terephthalamide) (PPTA) homopolymer fibers, around the tensile pressure armor layers. Such strips have a high mechanical tensile strength along their longitudinal axis, thereby limiting the swelling of the tensile pressure armor layers. They also have great bending flexibility, which facilitates the operations of handling and winding around the armor layers. Finally, with equivalent mechanical properties, they are much lighter than metal strips, thereby reducing the weight of the flexible pipe. Reference can be made in particular to document FR 2 837 899 in which such a pipe is disclosed.

These reinforcing strips are in the form of bundles of rovings comprising PPTA homopolymer fibers directed parallel to the longitudinal axis of the strip. These longitudinal rovings can be joined together into a relatively flat bundle having a substantially rectangular cross section like that of a strip or tape. It is also possible to use a reinforcing strip comprising a substantially rectangular central section and two longitudinal edges thinner than the central section, as described in document EP 1419338. The means for joining and restraining these rovings generally comprise transverse elements which are shaped so as to surround and clamp said rovings together into a relatively flat bundle. In common configurations, these transverse elements are treated as weft yarns, the rovings forming the warp, and the strip can then be considered as a woven material. Various embodiments of these reinforcing strips are described in documents WO 97/12753 and WO 9713091.

However, despite this, it has been found that in extreme service conditions, these reinforcing strips can deteriorate. These extreme conditions are chiefly encountered when the flexible pipe is submerged at great depth, typically at more than 2000 m, and simultaneously subjected to severe dynamic bending loads, thereby causing fatigue of the reinforcing strips.

SUMMARY OF THE INVENTION

Thus, one problem that arises and which the present invention proposes to solve is to provide a subsea flexible pipe which can withstand these extreme conditions of depth and dynamic bending loads, and for which the swelling of the tensile pressure armor layers can be durably contained to prevent the radial buckling into a "birdcage".

In order to solve this problem, the present invention proposes a subsea flexible pipe for conveying hydrocarbons, said flexible pipe comprising, from the interior to the exterior, an internal sealing sheath, at least one tensile pressure armor layer wound around said internal sealing sheath, a retaining layer comprising at least one reinforcing strip wound around said tensile pressure armor layer, and at least one tubular structure surrounding said retaining layer, said reinforcing strip comprising rovings directed substantially longitudinally, said rovings comprising polymer fibers; according to the invention, said polymer fibers have, at ambient temperature, a tensile modulus higher than 55 GPa, so that said reinforcing strip is able to prevent the radial expansion of said armor layer, when said armor layer is subjected to radial forces; and said polymer fibers further have an elongation at break higher than 4% so that said reinforcing strip is able to undergo deformations without breaking.

In the present application, the terms "strip" and "tape" are considered to be equivalent and are both used. The term "filament" designates a very long fiber. The term "yarn" designates a combination created by the juxtaposition or joining of a plurality of fibers or filaments. The term "roving" designates the juxtaposition or joining of a plurality of fibers, filaments or yarns. In the case of the reinforcing strips of the present invention, the yarns and filaments are generally joined by a relatively low twist, in order to avoid lowering the tensile strength along the roving axis.

The abovementioned tensile modulus and elongation at break are measured by a tensile test according to standard ASTM D885-04. This test is performed not on an individual fiber, but on a yarn comprising 500 to 2500 identical and equally long fibers or filaments. The twist of the yarn used for the test is lower than 100 turns per meter and, for example, about 60 turns per meter, thereby improving the reproducibility and accuracy of the measurements, in agreement with the recommendations of the abovementioned standard. The distance between jaws at the start of the tensile test is about 400 mm. The tensile loading rate is about 50 mm/min. The ambient temperature at which these tests are performed is about 18° C. to 23° C.

Thus, one feature of the invention resides in the choice of a reinforcing strip in which the tensile modulus of the polymer fibers having the reinforcing function is not necessarily very high, but of which the elongation at break is relatively high. In this way, both the value of the tensile modulus above 55 GPa, and the elongation at break, which must be higher than 4%, are important.

In fact, the retaining layer is gripped between the yarns constituting the external tensile pressure armor layer and the external tubular structure. However, the movements of the flexible pipe, by generating relative displacements between the armor yarns, lead either to the local stretching of the retaining layer at the clearances between said armor yarns, or to a local compression, so that folds are formed at said clearances. Subsequently, the repetition of these compression and folding cycles generates fatigue of the polymer fibers. However, the higher the elongation at break of the polymer fibers of the retaining layer, the lower the capacity of the stretching and folding of the retaining layer between the armor yarns to cause the breakage of these polymer fibers. Furthermore it is demonstrated that the use of a reinforcing strip in which the polymer fibers performing the reinforcing function have an elongation at break that is higher than 4% significantly improves the fatigue behavior of the retaining layer.

Advantageously, said polymer fibers further have an elongation at break, measured at ambient temperature, higher than 4.2%. This feature further improves the fatigue behavior of the retaining layer.

Advantageously, said polymer fibers further have a tensile modulus, measured at ambient temperature, higher than 60 GPa. This feature, at equivalent quantity of fibers, serves to reduce the swelling of the retaining layer in the eventuality that the external sheath is not sealed.

Furthermore, and especially advantageously, said polymer fibers have a tensile strength, measured at ambient temperature, (according to standard ASTM D885-04) higher than 3000 MPa, so that the measurement of the area under the stress/strain curve, which is representative of the energy that these fibers can absorb, is further increased.

Advantageously, said polymer fibers further have a tensile strength, measured at the temperature of 130° C. (according to standard ASTM D885-04) higher than 2300 MPa, preferably 2500 MPa. In this way, it is possible to make a retaining layer which can operate at a temperature of about 100° C. to 130° C., for example in a flexible pipe for conveying a high temperature fluid.

Advantageously, the polymers of said fibers are copolymers and preferably polymers belonging to the aramid family, and more particularly, aramids of the para type (as opposed to the meta type). Furthermore, said polymer fibers are held together, preferably pressed together, so as to increase their mutual friction coefficient, and to increase the tensile strength of the roving.

Advantageously, the polymers of said fibers are co-poly-(paraphenylene/3,4'-oxydiphenylene terephthalamides).

Moreover, the reinforcing strip further comprises restraining means to hold said rovings together. According to a preferred embodiment of the invention, said reinforcing strip is a woven material. Thus, the restraining means for holding the various rovings together comprise at least one weft yarn woven with said rovings, which constitute the warp elements. Such weft yarns, not being subjected to the tensile forces applied to the strip, can advantageously be made from a weak material that is different from that of the rovings.

Advantageously, the reinforcing strips are wound in a short pitch, thereby increasing the swelling resistance of the retaining layer.

Advantageously, this winding forms contiguous wraps to make the retaining layer stronger. Moreover, the retaining layer may comprise several windings superimposed on one another and optionally interwoven. This serves to make a retaining layer having a greater thickness than that of the strips.

Furthermore, the tubular structure advantageously comprises an external sheath which is applied to the retaining layer, and which presses it against the armor layers when the pipe is extended on very deep seabeds.

Other features and advantages of the invention will appear from a reading of the description of particular embodiments of the invention given below, provided for information but nonlimiting, in conjunction with the appended drawings in which:

DESCRIPTION OF A PREFERRED EMBODIMENT

Figure 1:
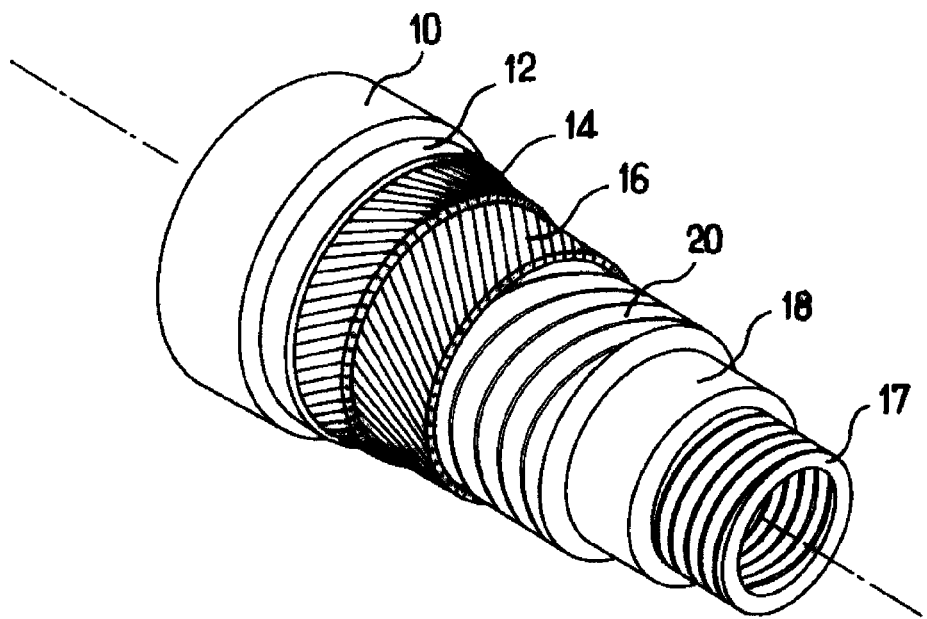
FIG. 1 is a schematic partial perspective view of a flexible pipe according to the invention.

FIG. 1 shows a pipe according to the invention comprising, from the exterior to the interior, a polymer external sheath 10 (called external sheath), a retaining layer 12 which is described in detail below, wound around an external tensile pressure armor layer 14, an internal tensile pressure armor layer 16 wound in the opposite direction to the external layer 14, a pressure armor layer 20 for absorbing the radial forces generated by the pressure of the fluid conveyed, a polymer internal sealing sheath 18 and an internal carcass 17 for absorbing the radial crushing forces. Owing to the presence of the internal carcass 17, this pipe is referred to as a rough bore pipe. The invention could also apply to a smooth bore pipe, which does not comprise an internal carcass. Similarly, it would remain within the scope of the present invention to eliminate the pressure armor layer 20, provided that the helix angles of the yarns constituting the armor layers 14, 16 are close to 55° and in the opposite direction. The armor layers 14, 16 are obtained by the long pitch winding of a series of metal or composite yarns, having a generally substantially rectangular cross section. The invention would also apply if these yarns had a circular or complex geometry cross section, for example of the self-interlocking T type. In FIG. 1, only two armor layers 14 and 16 are shown, but the pipe could also comprise one or more additional armor pairs. The armor layer 14 is called external because it is the final layer here, starting from the interior of the pipe, before the external sheath 10. The retaining layer 12 is generally wound around the external layer 14, but the invention would also apply in the case of a retaining layer inserted between two tensile pressure armor layers. Such a configuration is disclosed in document FR 2 837 899.

The retaining layer 12 may comprise several strips, tapes or unitary elements wound in a short pitch around the external armor layer 14. This winding is generally contiguous or overlapping in order to increase the capacity to absorb the radial swelling forces. The unitary elements of the retaining layer have a high longitudinal tensile strength along their longitudinal axis.

Thus, the unitary retaining elements are made from suitable materials, and in this case from a reinforcing strip of polymer fibers having specific properties. The reinforcing strip is made by the woven or nonwoven assembly of said fibers.

This retaining layer 12 is intended to prevent the radial expansion of said armor layer, when it is subject to radial forces. This is moreover the case when the flexible pipe, extended on a very deep seabed, undergoes a major reverse end cap effect, and when the tensile pressure armor layers 14, 16 tend to swell radially under the effect of the axial compression. As long as the external sheath 10 is sealed, the retaining layer 12 has no function because the radial swelling of the tensile pressure armor layers 14, 16 is prevented by the external hydrostatic pressure. On the contrary, in the eventuality that the external sheath 10 is accidentally torn, the retaining layer 12 must immediately contain the radial expansion of the armor layers and thereby prevent the formation of a "birdcage" defect. The retaining layer 12 must therefore be sufficiently strong to absorb the radial expansion of the tensile pressure armor layers 14, 16, at the time when any tearing of the external sheath 10 occurs.

Unexpectedly, it has been discovered that the polymers having mechanical properties capable of withstanding the abovementioned very severe loading conditions were not so much those having a high tensile modulus, but rather those having a combination of high elongation capacity with relatively high modulus. At ambient temperature, these materials have a tensile modulus higher than 55 GPa, advantageously higher than 60 GPa, and above all, a relatively high elongation at break, higher in practice than 4% and advantageously higher than 4.2%.

Moreover, advantageously, an anti-wear layer of polymer material can be inserted between the external tensile pressure armor layer 16 and the retaining layer 12, so as to protect the polymer fibers of the retaining layer 12 from wear in contact with the metal armor layers. The anti-wear layers, which are well known to a person skilled in the art, are generally made by helical winding of one or more strips obtained by extruding a polymer material based on polyamide, polyolefins, or polyvinylidene fluoride (PVDF). Reference can also be made to document WO 2006/120320, which describes anti-wear layers comprising strips of polysulfone (PSU), polyethersulfone (PES), polyphenylsulfone (PPSU), polyetherimide (PEI), polytetrafluoroethylene (PTFE), polyetheretherketone (PEEK) or phenylene polysulfide (PPS). In the alternatives not shown in which a retaining layer is placed between two tensile pressure armor layers, it is advantageous to insert two anti-wear layers in contact respectively with the inner and outer faces of this retaining layer, so as to prevent direct contact between the polymer fibers of this retaining layer and one of these two armor layers.

Figure 2:
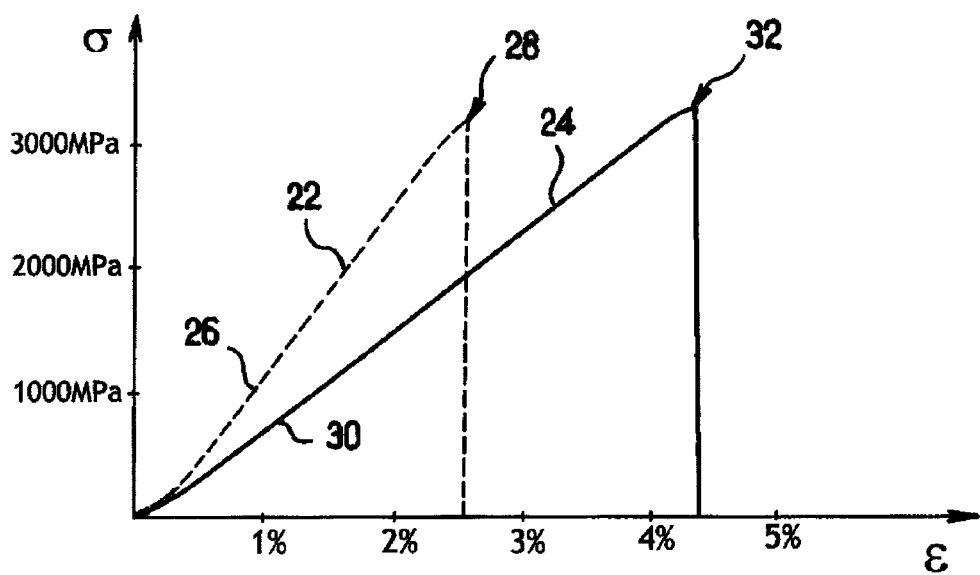
FIG. 2 is a graph showing the mechanical properties of synthetic materials of the polymer type.

Reference can be made to FIG. 2, showing the mechanical properties of the polymers suitable for making reinforcing strips according to the invention. FIG. 2 shows the percent elongation of the polymer analyzed on the x-axis, and the tensile force applied to it on the y-axis. The broken curve 22 shows the mechanical properties of a polymer that is unsuitable for making a reinforcing strip according to the invention, while the solid curve 24 is that of a suitable polymer.

In fact, curve 22 is that of polymer fibers of which the tensile modulus E, corresponding to the slope of the first portion of curve 26, is high, but of which the elongation at break 28 is relatively low, 2.5% here. By contrast, curve 24 shows a tensile modulus E corresponding to the slope of the first portion of curve 30, which is lower but higher than 55 GPa, and above all, has an elongation at break 32 higher than 4%. It may be noted that at equivalent tensile stress, the polymer corresponding to curve 22 is much less elongated than the one corresponding to curve 24. For example, for an applied tensile stress of 1500 MPa, the first is elongated about 1.2% and the second about 2%. In consequence, at equivalent loading and equivalent dimensions, a retaining layer comprising the polymer corresponding to curve 24 swells virtually twice as much as another comprising the polymer corresponding to curve 22. Thus, since the function of the retaining layer is precisely to prevent the swelling of the tensile pressure armor layers, a person skilled in the art would hitherto naturally have selected the low-elongation high-modulus polymer, as this choice would also reduce the quantity of fibers and hence the weight and cost of the retaining layer. The present invention therefore goes against this preconception.

It may also be noted in the examples in FIG. 2 that polymer fibers having a tensile modulus higher than 55 GPa also generally have virtually linear and elastic behavior up to break. The plastic deformation phase just before break is thus very short, so that in practice, the yield stress is very close to the breaking stress.

High-performance polymers of the polyethylene type are known, having both a tensile modulus higher than 55 GPa and a tensile elongation at break higher than 4%. These materials can be used for implementing the present invention, but only for low temperature applications, typically lower than 40° C. This is because polyethylene fibers melt at about 150° C., so that above a temperature of 50° C., creep and a lowering of the mechanical properties sharply degrade their performance.

It is more advantageous to use aramid polymers because they have better temperature behavior, particularly at about 130° C., which is the maximum temperature, in light of present-day technologies, that a flexible pipe for conveying hydrocarbons can withstand. This is because the melting point of aramid fibers is very high, about 500° C. Hence they do not deteriorate at temperatures below 130° C., and preserve most of their mechanical properties at these temperatures. Thus, some of these fibers have a tensile strength above 2700 MPa at 80° C. and above 2300 MPa at 130° C., making them suitable for use in the flexible pipes for conveying hydrocarbons at 130° C.

Among aramid polymers, it has been demonstrated that co-poly-(paraphenylene/3,4'-oxydiphenylene terephthalamides), having the formula:

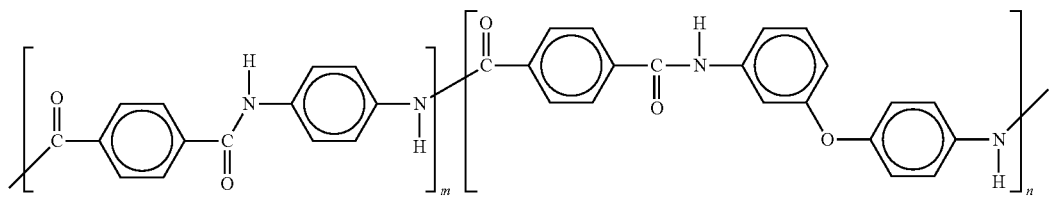

are ideal for making a reinforcing strip for the retaining layer 12 according to the invention. These copolymers have particularly advantageous mechanical properties for the implementation of the present invention. In fact, at ambient temperature, their tensile modulus is close to 70 GPa, their elongation at break is close to 4.5%, and their tensile strength is close to 3400 MPa. These results were obtained from tensile tests conducted according to standard ASTM D885-04 on a yarn having a linear density of about 3300 dtex comprising about 2000 elementary fibers and having an average twist of 60 turns per meter.

These copolymers generally have a degree of crystallinity lower than that of PPTA homopolymers, giving them a higher capacity to absorb wide-amplitude deformations, while preserving their essential mechanical properties.

Figure 3:
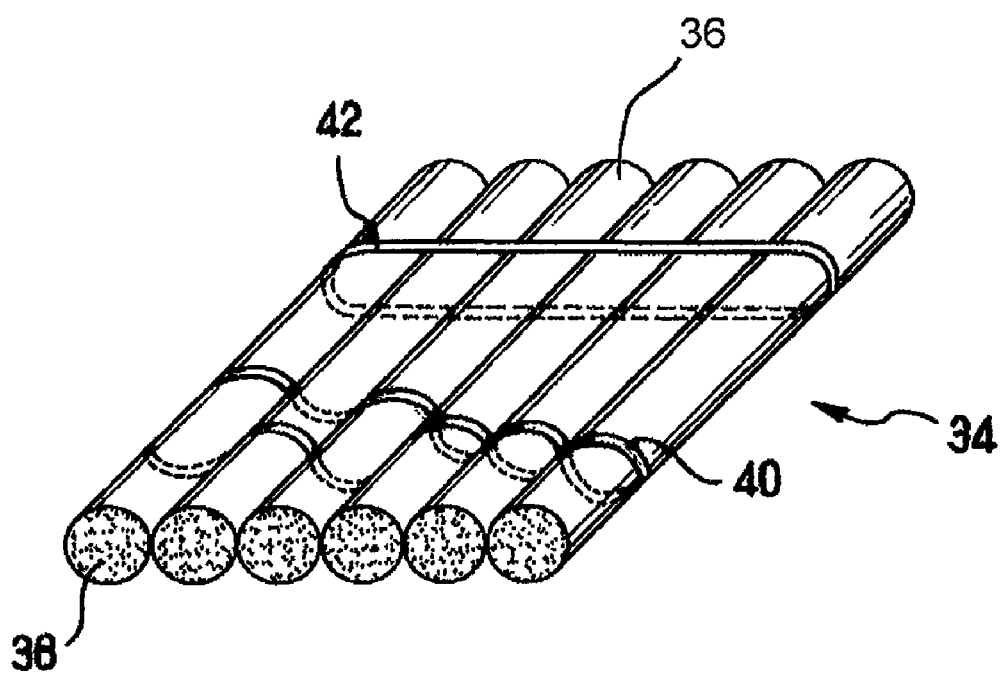
FIG. 3 is a schematic partial perspective view of a reinforcing strip according to the invention.

FIG. 3 shows an example of a reinforcing strip 34 according to the invention. The strip 34 comprises several rovings 36 directed longitudinally to its axis. The rovings 36 comprise the assembly of yarns, filaments or fibers 38 made from a polymer material according to the present invention. The rovings 36 are juxtaposed and held together by restraining means 40, 42 directed across the axis of the strip 34. These restraining means may comprise ties 42 surrounding the assembly, or weft yarns 40 woven with the rovings 36, the latter then comprising the warp elements. Since the restraining means are not intended to absorb the longitudinal tensile forces, they can be made from polymers that are weaker than those used for the rovings 36.

The invention claimed is:

1. A subsea flexible pipe for conveying hydrocarbons, said flexible pipe comprising, from an interior to an exterior thereof, an internal sealing sheath, at least one tensile pressure armor layer wound around said internal sealing sheath, a retaining layer comprising at least one reinforcing strip wound around said tensile pressure armor layer, and at least one tubular structure surrounding said retaining layer;
   said reinforcing strip comprising rovings directed substantially longitudinally along said pipe, said rovings comprising polymer fibers having, at ambient temperature, a tensile modulus higher than 55 GPa, so that said reinforcing strip prevents radial expansion of said armor layer, when said armor layer is subjected to radial forces; and
   said polymer fibers further having an elongation at break higher than 4% so that said reinforcing strip is able to undergo deformations without breaking.

2. The subsea flexible pipe as claimed in claim 1, wherein said reinforcing strip further comprises restraining elements to hold said rovings together.

3. The subsea flexible pipe as claimed in claim 1, wherein said polymer fibers are held together against one another.

4. The subsea flexible pipe as claimed in claim 1, wherein said polymer fibers have, at ambient temperature, an elongation at break higher than 4.2%.

5. The subsea flexible pipe as claimed in claim 4, wherein said polymer fibers have, at ambient temperature, a tensile modulus higher than 60 GPa.

6. The subsea flexible pipe as claimed in claim 5, wherein said polymer fibers have, at ambient temperature, a tensile strength higher than 3000 MPa.

7. The subsea flexible pipe as claimed in claim 6, wherein said polymer fibers include polymers which have, at a temperature of 130°, a tensile strength higher than 2300 MPa.

8. The subsea flexible pipe as claimed in claim 7, wherein said polymers of said fibers are copolymers.

9. The subsea flexible pipe as claimed in claim 7, wherein said polymers of said fibers are polymers belonging to an aramid family.

10. The subsea flexible pipe as claimed in claim 9, wherein said polymers of said fibers are co-poly-(paraphenylene/3,4'-oxydiphenylene terephthalamides).

11. The subsea flexible pipe as claimed in claim 1, wherein said rovings are woven together to form said reinforcing strip.

12. The subsea flexible pipe as claimed in claim 1, wherein said tubular structure comprises an external sheath which is applied to said retaining layer.

13. The subsea flexible pipe as claimed in claim 1, wherein said polymer fibers have, at ambient temperature, a tensile modulus higher than 60 GPa.

14. The subsea flexible pipe as claimed in claim 1, wherein said polymer fibers have, at ambient temperature, a tensile strength higher than 3000 MPa.

15. The subsea flexible pipe as claimed in claim 1, wherein said polymer fibers include polymers which have, at a temperature of 130°, a tensile strength higher than 2300 MPa.

16. The subsea flexible pipe as claimed in claim 1, wherein said polymers of said fibers are copolymers.

17. The subsea flexible pipe as claimed in claim 1, wherein said polymers of said fibers are polymers belonging to an aramid family.

* * * * *

UNITED STATES PATENT AND TRADEMARK OFFICE
CERTIFICATE OF CORRECTION

PATENT NO. : 8,353,316 B2  Page 1 of 1
APPLICATION NO. : 12/812055
DATED : January 15, 2013
INVENTOR(S) : Anh Tuan Do It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 282 days.

Signed and Sealed this
First Day of September, 2015

Michelle K. Lee
*Director of the United States Patent and Trademark Office*